(12) United States Patent
Connolly et al.

(10) Patent No.: US 10,027,148 B2
(45) Date of Patent: Jul. 17, 2018

(54) PORTABLE ELECTRIC VEHICLE SUPPLY EQUIPMENT (EVSE) SYSTEM

(71) Applicant: FORD GLOBAL TECHNOLOGIES, INC., Dearborn, MI (US)

(72) Inventors: Brittany Connolly, Plymouth, MI (US); Sriram Jala, Northville, MI (US); Susan Curry, Canton, MI (US); John Paul Gibeau, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 94 days.

(21) Appl. No.: 15/060,982

(22) Filed: Mar. 4, 2016

(65) Prior Publication Data

US 2017/0256966 A1 Sep. 7, 2017

(51) Int. Cl.
*H02J 7/00* (2006.01)
*B60L 11/18* (2006.01)

(52) U.S. Cl.
CPC ......... *H02J 7/0042* (2013.01); *B60L 11/1816* (2013.01); *H02J 7/0052* (2013.01); *B60L 2230/12* (2013.01)

(58) Field of Classification Search
CPC .... H02J 7/0042; H02J 7/0052; B60L 11/1816
See application file for complete search history.

(56) References Cited

U.S. PATENT DOCUMENTS

| | | |
|---|---|---|
| 6,567,277 B1 | 5/2003 | Doherty et al. |
| 8,246,376 B2 | 8/2012 | Amit et al. |
| 9,073,446 B2 | 7/2015 | Hani et al. |
| 2001/0046425 A1 | 11/2001 | Vagnino |
| 2011/0169447 A1 | 7/2011 | Brown et al. |
| 2011/0175570 A1 | 7/2011 | Lucas |
| 2013/0020984 A1 | 1/2013 | Lucas et al. |
| 2014/0167693 A1* | 6/2014 | Wood .................... H02J 7/0042 320/109 |
| 2015/0042275 A1 | 2/2015 | Schoener et al. |
| 2015/0097090 A1 | 4/2015 | Musick |
| 2015/0380843 A1* | 12/2015 | Dubal .................... H01R 13/20 439/37 |
| 2016/0158594 A1* | 6/2016 | Penney .............. A63B 21/4035 482/139 |

OTHER PUBLICATIONS

Mercedes-Benz B-Class Electric Drive Operators Manual, 338 pages, Order No. 65155609 13, Part No. 2425843100, Edition B 2015.

* cited by examiner

*Primary Examiner* — Vuthe Siek
(74) *Attorney, Agent, or Firm* — Carlson, Gaskey & Olds

(57) ABSTRACT

An electrified vehicle includes a surface, an electric vehicle supply equipment (EVSE) system attachable to the surface, and a retention assembly configured to removably secure the EVSE system to the surface. The retention assembly includes a first segment affixed to the surface and a second segment affixed to the EVSE system.

12 Claims, 5 Drawing Sheets

PORTABLE ELECTRIC VEHICLE SUPPLY EQUIPMENT (EVSE) SYSTEM

TECHNICAL FIELD

This disclosure relates generally to a charging system for an electrified vehicle. More particularly, this disclosure details a portable electric vehicle supply equipment system for an electrified vehicle.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A charging system is used to connect an electrified vehicle to an external power source, such as a wall outlet or a charging station, to charge the energy sources of the electrified vehicle battery pack. Some charging systems include electric vehicle supply equipment (EVSE) systems that receive electric power from a utility grid or other source and transfer it to the vehicle through a coupler that plugs into a charging port of the vehicle.

SUMMARY

An electrified vehicle according to an exemplary aspect of the present disclosure includes, among other things, a surface, an electric vehicle supply equipment (EVSE) system attachable to the surface, and a retention assembly configured to removably secure the EVSE system to the surface. The retention assembly includes a first segment affixed to the surface and a second segment affixed to the EVSE system.

In a further non-limiting embodiment of the foregoing electrified vehicle, the first segment and the second segment include touch fasteners that temporarily bind when pressed together.

In a further non-limiting embodiment of either of the foregoing electrified vehicles, the touch fasteners include either loops or hooks of material.

In a further non-limiting embodiment of any of the foregoing electrified vehicles, the first segment includes a magnetic plate or a metallic plate and the second segment includes the other of the magnetic plate and the metallic plate.

In a further non-limiting embodiment of any of the foregoing electrified vehicles, the first segment includes one of a male part and a female part of a snap fastener system and the second segment includes the other of the male part and the female part.

In a further non-limiting embodiment of any of the foregoing electrified vehicles, the male part protrudes from the surface and extends through an opening of the EVSE system, and the female part snaps onto an end of the male part that protrudes from the opening.

In a further non-limiting embodiment of any of the foregoing electrified vehicles, the surface is a wall located inside the electrified vehicle.

In a further non-limiting embodiment of any of the foregoing electrified vehicles, the surface is a wall of a cargo area of the electrified vehicle.

In a further non-limiting embodiment of any of the foregoing electrified vehicles, the EVSE system includes coupler, a plug, a control box, a first wire extending between the coupler and the control box, and a second wire extending between the plug and the control box.

In a further non-limiting embodiment of any of the foregoing electrified vehicles, the EVSE system includes a cable management system having a reel for storing the first wire and the second wire.

In a further non-limiting embodiment of any of the foregoing electrified vehicles, at least one hook protrudes from the surface, the at least one hook configured to receive wiring of the EVSE system.

In a further non-limiting embodiment of any of the foregoing electrified vehicles, a bag is configured to carry the EVSE system.

An electrified vehicle according to another exemplary aspect of the present disclosure includes, among other things, a surface, an electric vehicle supply equipment (EVSE) system mountable to the surface, a first touch fastener on the surface, and a second touch fastener on the EVSE system and configured to temporarily bind to the first touch fastener when the first touch fastener and the second touch fastener are pressed together.

In a further non-limiting embodiment of the foregoing electrified vehicle, the second touch fastener is affixed to a control box of the EVSE system.

In a further non-limiting embodiment of either of the foregoing electrified vehicles, the second touch fastener is affixed to a reel of the EVSE system.

In a further non-limiting embodiment of any of the foregoing electrified vehicles, the second touch fastener is affixed to a coupler of the EVSE system.

In a further non-limiting embodiment of any of the foregoing electrified vehicles, the second touch fastener is affixed to a bag configured to carry the EVSE system.

In a further non-limiting embodiment of any of the foregoing electrified vehicles, the first touch fastener and the second touch fastener include hooks or loops of material that are engageable to one another to bind the first touch fastener and the second touch fastener together.

In a further non-limiting embodiment of any of the foregoing electrified vehicles, the surface is a wall of a cargo area of the electrified vehicle.

In a further non-limiting embodiment of any of the foregoing electrified vehicles, the first touch fastener is integrated into the surface.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a portable electric vehicle supply equipment (EVSE) system for an electrified vehicle. A retention assembly secures the EVSE system to a surface of the electrified vehicle, such as a wall inside the electrified vehicle. The retention assembly may include touch fasteners, magnetic retention devices or a snap fastener retention system. These and other features are described in greater detail in the following paragraphs of this detailed description.

Figure 1:
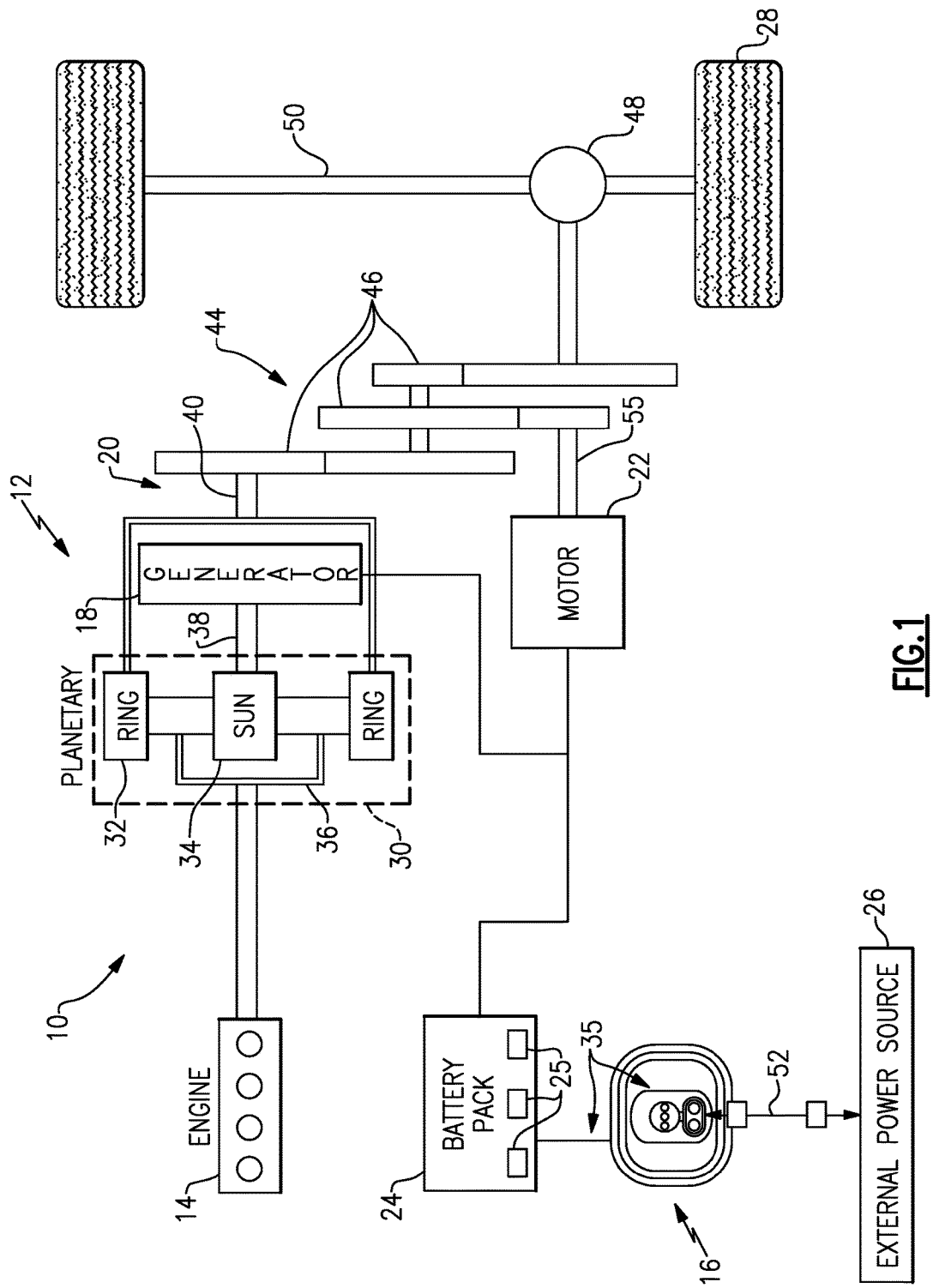
FIG. 1 schematically illustrates a powertrain of an electrified vehicle.

FIG. 1 schematically illustrates a powertrain 10 for an electrified vehicle 12. In one non-limiting embodiment, the electrified vehicle 12 is a plug-in hybrid electric vehicle (PHEV). However, other electrified vehicles could also benefit from the teachings of this disclosure, including but not limited to, battery electric vehicles (BEV's).

In one non-limiting embodiment, the powertrain 10 is a power-split powertrain system that employs a first drive system and a second drive system. The first drive system may include a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 55 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 also includes a charging system 16 for charging the energy storage devices (e.g., battery cells) of the battery pack 24. The charging system 16 is connectable to an external power source 26 (e.g., utility/grid power from an electrical grid) for receiving and distributing power throughout the electrified vehicle 12. For example, in one non-limiting embodiment, the charging system 16 includes a charging port 35 located on-board the electrified vehicle 12 and an EVSE system 52 that is operably connected between the charging port 35 and the external power source 26. The charging port 35 is adapted to selectively receive power from the external power source 26, through the EVSE system 52, and then supply the power to the battery pack 24 for charging the battery cells.

The charging system 16 may be equipped with power electronics for converting AC power received from the external power source 26 to DC power for charging the energy storage devices of the battery pack 24. The charging system 16 is also configured to accommodate one or more conventional voltage sources from the external power source 26 (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
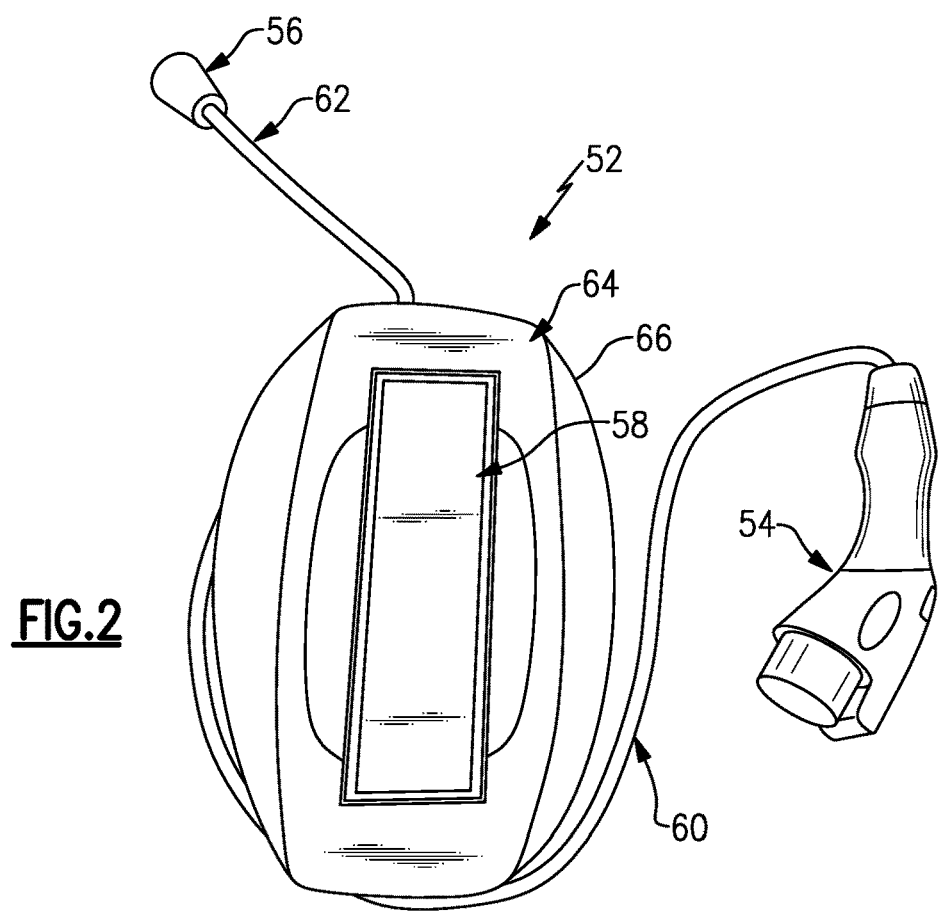
FIG. 2 illustrates an electric vehicle supply equipment (EVSE) system for charging an electrified vehicle.

FIG. 2, with continued reference to FIG. 1, illustrates an exemplary EVSE system 52 for use with the electrified vehicle 12. For example, the EVSE system 52 may be part of the charging system 16 of the electrified vehicle 12. The EVSE system 52 is a portable device that is completely removable from the electrified vehicle 12.

In one non-limiting embodiment, the EVSE system 52 includes a coupler 54, a plug 56 and a control box 58. A first wire 60 extends between the coupler 54 and the control box 58, and a second wire 62 extends between the plug 56 and the control box 58. The coupler 54 may be attached to the charging port 35 of the charging system 16, and the plug 56 may be plugged into a power outlet connected to the external power source 26 to supply energy from the external power source 26 to the battery pack 24 for charging the battery cells.

The control box 58 includes various fuses, relays, transformers and a circuit board with processing capability for communicating with other components of the charging system 16, such as the charging port 35. The control box 58 may additionally include indicators, such as LED's, that provide a visual output to the owner/operator of the electrified vehicle 12. The visual output can indicate a charging occurrence, a charging system fault, charging completed, or any other information to the owner/operator. Although shown as a separate component in FIG. 2, the control box 58 could be integrated into the coupler 54, the plug 56 or the wires 60, 62.

The EVSE system 52 may optionally include a cable management system 64 for organizing and retaining the first wire 60 and the second wire 62 when the EVSE system 52 is not in use. In one non-limiting embodiment, the cable management system 64 includes a reel 66 for winding the wires 60, 62 for storing and packaging purposes.

Figure 3:
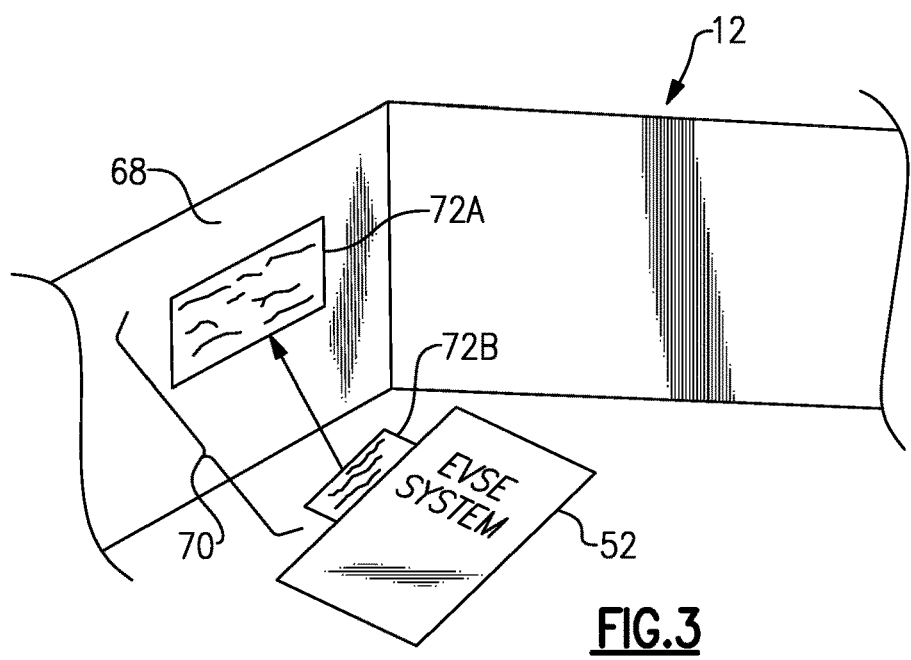
FIG. 3 schematically illustrates mounting an EVSE system to a surface of an electrified vehicle.

Referring now primarily to FIG. 3, the portable EVSE system 52 may be removably mounted to a surface 68 of the electrified vehicle. The surface 68 can be any surface within the electrified vehicle 12 at which the EVSE system 52 could be mounted for simplified storage and ease of access. In one non-limiting embodiment, the surface 68 is a wall located in a cargo area of the electrified vehicle 12. However, other mounting locations are also contemplated within the scope of this disclosure.

A retention assembly 70 is employed to removably secure the EVSE system 52 to the surface 68 of the electrified vehicle 12. The retention assembly 70 may include a first segment 72A affixed to the surface 68 and a second segment 72B affixed to a portion of the EVSE system 52. The first and second segments 72A, 72B may be affixed to the surface 68 and the EVSE system 52, respectively, in any known manner. In one non-limiting embodiment, the first segment 72A is integrally molded, sewn or otherwise integrated into the surface 68 and the second segment 72B is adhered to or otherwise bonded to the EVSE system 52 using an adhesive. The second segment 72B is connectable to the first segment 72A to mount the EVSE system 52 to the surface 68, thereby securing the EVSE system 52 inside the electrified vehicle 12 in a simple manner that is easy to access as needed for recharging the battery pack 24.

Figure 4A:
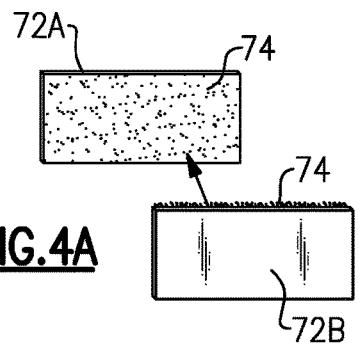
FIGS. 4A, 4B, 4C, 4D and 4E illustrate a retention assembly for mounting an EVSE system to a surface of an electrified vehicle according to a first embodiment of this disclosure.

Various retention assembly designs are contemplated for mounting the EVSE system 52 to the surface 68 of the electrified vehicle 12. Referring first to FIG. 4A, for example, the first segment 72A and the second segment 72B of the retention assembly 70 may include touch fasteners 74, which are also commonly referred to as hook-and-loop fasteners. Suitable touch fasteners are commercially available under the trademark VELCRO from the Velcro Industries B.V. The touch fasteners 74 of the second segment 72B temporality bind to the touch fasteners 74 of the first segment 72A when the first and second segments 72A, 72B are pressed together. In one non-limiting embodiment, the touch fasteners 74 of the first segment 72A include relatively small hooks of material and the touch fasteners 74 of the second segment 72B include relatively small loops of material. Of course, an opposite configuration is also contemplated in which the touch fasteners 74 of the first segment 72A include loops and the touch fasteners 74 of the first segment 72A include hooks.

Figure 4B:
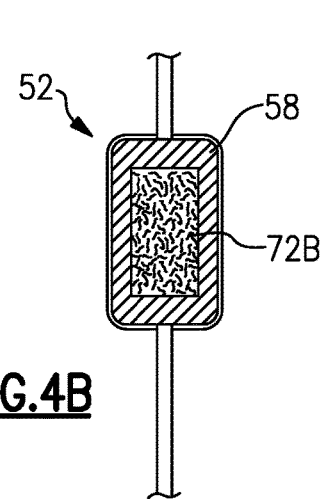
Figure 4C:
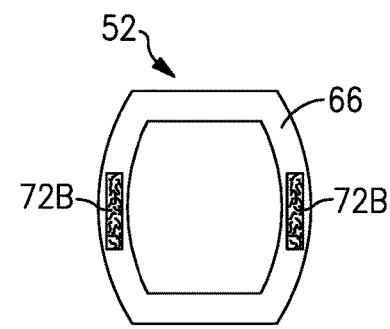
Figure 4D:
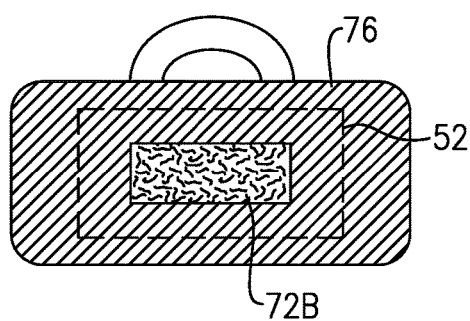
Figure 4E:
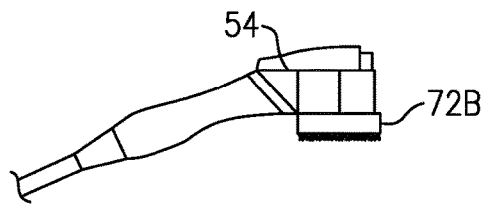

In a non-limiting embodiment, one or more of the second segments 72B are secured to the control box 58 of the EVSE system 52 (see FIG. 4B). In another non-limiting embodiment, one or more of the second segments 72B are secured to the reel 66 of the EVSE system 52 (see FIG. 4C). In yet another non-limiting embodiment, one or more of the second segments 72B are secured to a bag 76 that can be provided to carry the EVSE system 52 (see FIG. 4D). In yet another non-limiting embodiment, one or more of the second segments 72B are secured to the coupler 54 (see FIG. 4E). The second segments 72B can be provided on only one component of the EVSE system 52 or on any combination of the components shown in FIGS. 4B through 4E.

Figure 5A:
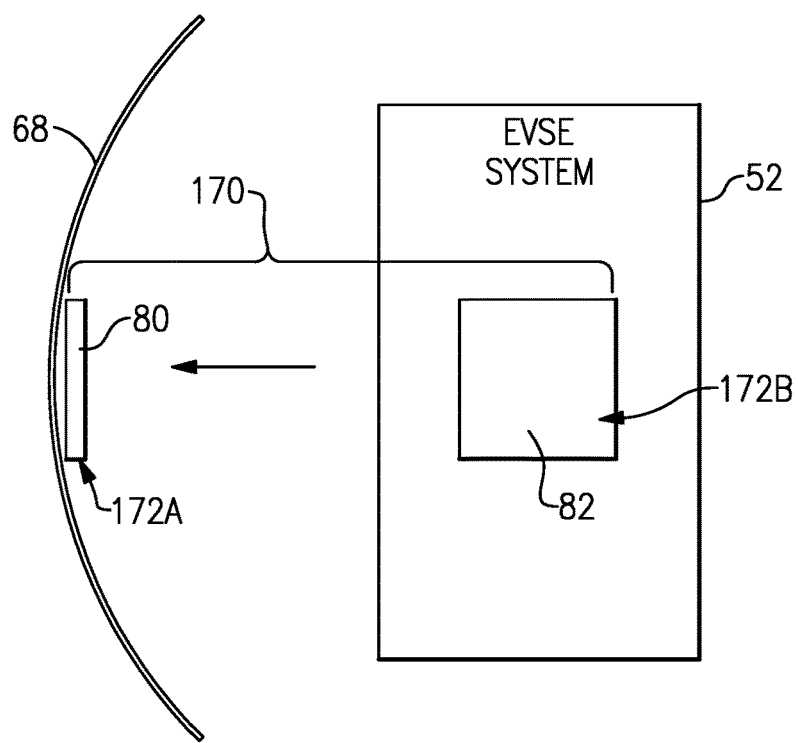
FIGS. 5A and 5B illustrate a retention assembly according to a second embodiment of this disclosure.
Figure 5B:
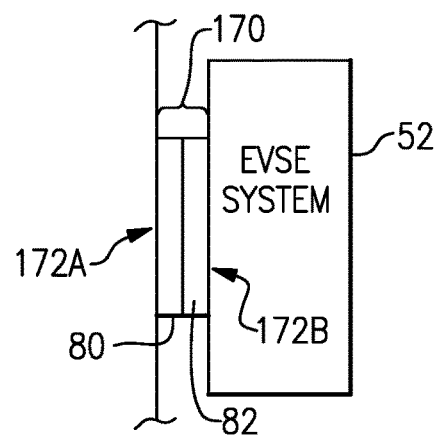

FIGS. 5A and 5B illustrate another exemplary retention assembly 170. In this disclosure, like reference numbers designate like elements where appropriate and reference numerals with the addition of 100 or multiples thereof designate modified elements that are understood to incorporate the same features and benefits of the corresponding original elements.

The retention assembly 170 includes a first segment 172A affixed to the surface 68 and a second segment 172B affixed to a portion of the EVSE system 52. FIG. 5A shows the first and second segments 172A, 172B in a detached position and FIG. 5B shows the first and second segments 172A, 172B in an attached position. In this embodiment, the first segment 172A includes a first plate 80 and the second segment 172B includes a second plate 82 that can be connected to the first plate 80. In a first non-limiting embodiment, the first plate 80 is a magnetic plate and the second plate 82 is a metallic plate that can be magnetically connected to the first plate 80. Of course, an opposite configuration is also contemplated in which the magnetic plate is affixed to the EVSE system 52 and the metallic plate is affixed to the surface 68. In a second non-limiting embodiment, the first plate 80 and the second plate 82 are magnetic plates having opposite polarities.

Figure 6A:
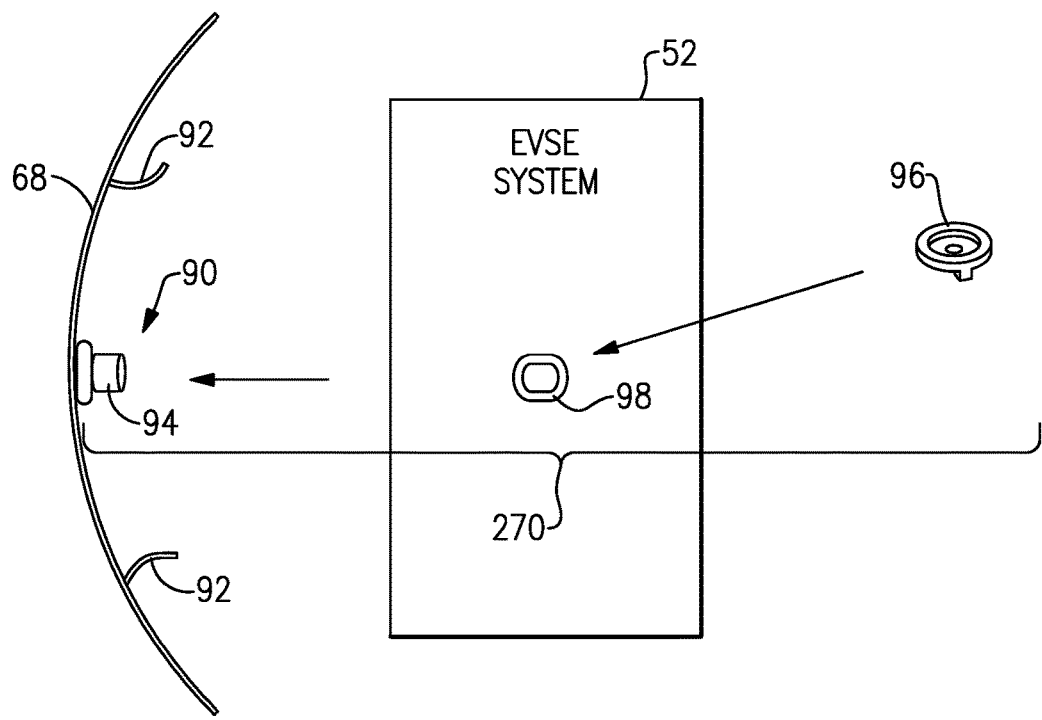
FIGS. 6A and 6B illustrate a retention assembly according to yet another embodiment of this disclosure.
Figure 6B:
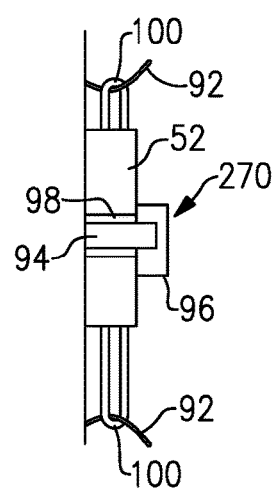

FIGS. 6A and 6B illustrate yet another exemplary retention assembly 270. In this embodiment, the retention assembly 270 includes a snap fastener system 90 and one or more hooks 92. The snap fastener system 90 includes a male part 94 (i.e., a first segment) and a female part 96 (i.e., a second segment). The male part 94 may be mounted to the surface 68 and the female part 96 may be mounted to the EVSE system 52, or vice versa. In another non-limiting embodiment, the segments of the snap fastener system 90 are magnetically connectable.

In one non-limiting embodiment, the male part 94 protrudes from the surface 68 and extends through an opening 98 of the EVSE system 52. The female part 96 snaps onto an end of the male part 94 that protrudes from the opening 98 to removably secure the EVSE system 52 to the surface 68 (see FIG. 6B).

One or more hooks 92 may protrude outwardly from the surface 68. Wiring 100 of the EVSE system 52 may be wrapped around the hooks 92. In one non-limiting embodiment, the hooks 92 are curved to prevent the wiring 100 from easily slipping off of the hooks 92.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
a surface;
a portable electric vehicle supply equipment (EVSE) system; and
a retention assembly configured to removably secure said EVSE system to said surface, said retention assembly including a first segment affixed to said surface and a second segment affixed to said EVSE system;
said first segment including a magnetic plate or a metallic plate and said second segment including the other of said magnetic plate and said metallic plate.

2. The electrified vehicle as recited in claim 1, wherein said surface is a wall located inside the electrified vehicle.

3. The electrified vehicle as recited in claim 1, wherein said surface is a wall of a cargo area of the electrified vehicle.

4. The electrified vehicle as recited in claim 1, wherein said EVSE system includes coupler, a plug, a control box, a first wire extending between said coupler and said control box, and a second wire extending between said plug and said control box.

5. The electrified vehicle as recited in claim 4, wherein said EVSE system includes a cable management system having a reel for storing said first wire and said second wire.

6. The electrified vehicle as recited in claim 1, comprising at least one hook that protrudes from said surface, said at least one hook configured to receive wiring of said EVSE system.

7. An electrified vehicle comprising:
a surface;
an electric vehicle supply equipment (EVSE) system attachable to said surface; and
a retention assembly configured to removably secure said EVSE system to said surface, said retention assembly including a first segment affixed to said surface and a second segment affixed to said EVSE system;
wherein said first segment includes one of a male part and a female part of a snap fastener system and said second segment includes the other of said male part and said female part;
wherein said male part protrudes from said surface and extends through an opening of said EVSE system, and said female part snaps onto an end of said male part that protrudes from said opening.

8. An electrified vehicle, comprising:
a surface;
a portable electric vehicle supply equipment (EVSE) system mountable to said surface;
a first touch fastener on said surface; and
a second touch fastener affixed on a control box, a reel, or a coupler of said EVSE system and configured to temporarily bind to said first touch fastener when said first touch fastener and said second touch fastener are pressed together.

9. The electrified vehicle as recited in claim 8, wherein said first touch fastener and said second touch fastener include hooks or loops of material that are engageable to one another to bind said first touch fastener and said second touch fastener together.

10. The electrified vehicle as recited in claim 8, wherein said surface is a wall of a cargo area of the electrified vehicle.

11. The electrified vehicle as recited in claim 8, wherein said first touch fastener is integrated into said surface.

12. A portable electric vehicle supply equipment (EVSE) system, comprising:
a coupler configured to plug into a vehicle charging port;
a plug configured to plug into an external power source;
a control box;
a reel configured for storing wires connected to the coupler and the plug;
a hook and loop touch fastener affixed to the coupler, the control box, or the reel and adapated for removably securing the EVSE system to a vehicle surface.

* * * * *

UNITED STATES PATENT AND TRADEMARK OFFICE
CERTIFICATE OF CORRECTION

PATENT NO. : 10,027,148 B2
APPLICATION NO. : 15/060982
DATED : July 17, 2018
INVENTOR(S) : Brittany Connolly et al.

Page 1 of 1

It is certified that error appears in the above-identified patent and that said Letters Patent is hereby corrected as shown below:

In the Claims

In Claim 4, Column 7, Line 47; replace "includes coupler" with --includes a coupler--

Signed and Sealed this
First Day of February, 2022

Drew Hirshfeld
*Performing the Functions and Duties of the
Under Secretary of Commerce for Intellectual Property and
Director of the United States Patent and Trademark Office*